United States Patent [19]

Nakayama et al.

[11] Patent Number: 4,645,882
[45] Date of Patent: Feb. 24, 1987

[54] LATCHING RELAY DRIVE CIRCUIT FOR USE IN TELEPHONE SETS

[75] Inventors: Yasunobu Nakayama, Musashino; Yasuji Sato, Hachioji, both of Japan

[73] Assignee: Kabushiki Kaisha Toshiba, Kawasaki, Japan

[21] Appl. No.: 717,797

[22] Filed: Mar. 29, 1985

[30] Foreign Application Priority Data

Jun. 29, 1984 [JP] Japan .................................. 59-134580

[51] Int. Cl.⁴ .............................................. H04M 1/00
[52] U.S. Cl. .................................... 379/387; 361/194; 361/156
[58] Field of Search .................. 179/81 R, 81 B, 90 B, 179/90 BB, 90 BD, 90 LS, 90 AD, 5 R, 5 P, 2 R; 361/155, 156, 194, 210, 208

[56] References Cited

U.S. PATENT DOCUMENTS

| | | | |
|---|---|---|---|
| 4,112,477 | 9/1978 | Sherwin | 361/156 |
| 4,435,622 | 3/1984 | Grantland et al. | 179/81 R |
| 4,558,182 | 12/1985 | Perry et al. | 179/81 R |

Primary Examiner—James L. Dwyer
Attorney, Agent, or Firm—Finnegan, Henderson, Farabow, Garrett & Dunner

[57] ABSTRACT

In a circuit for driving a latching relay for use in a telephone set, a capacitor is charged from a battery, and when the capacitor is charged to a predetermined value, the capacitor is disconnected from the battery. Thereafter the latching relay is driven by the discharge current of the capacitor. With this circuit, it is possible to prevent unnecessary consumption of the battery.

4 Claims, 5 Drawing Figures

LATCHING RELAY DRIVE CIRCUIT FOR USE IN TELEPHONE SETS

BACKGROUND OF THE INVENTION

1. Field of the Invention

This invention relates to a latching relay drive circuit for use in a telephone set, and more particularly a circuit for driving the latching relay by using a battery source.

2. Description of the Prior Art

There have been proposed many types of telephone sets having an on-hook dialling performance permitting dialling without taking up the handset of a telephone set and an automatic dialling performance which automatically dials after elapse of a predetermined waiting time. But in these telephone sets, in order to provide the performances described above, it is necessary to provide means which automatically perform a function such as a hook switch. A relay is generally used as such means operated by a control circuit.

A monostable type relay having a self-holding circuit has been used as the relay capable of providing the on-hook dialling performance and the automatic dialling performance described above, but since such monostable type relay consumes large power, it is necessary to use a source of large capacity. For this reason, it has been used a latching relay can be used which consumes less power and can be driven with by battery.

However, when the latching relay is driven by a battery, due to the internal resistance of the battery, it has been impossible to obtain a peak current of about several hundreds mA necessary to drive or set the latching relay so that it does not operate properly. This tendency increases greatly when the battery voltage decreases more or less, thus shortening the effective life of the battery.

SUMMARY OF THE INVENTION

It is therefore an object of this invention to provide a novel latching relay drive circuit capable of accurately operating the latching relay driven with a battery so as to ensure on-hook dialling and automatic dialling performance.

Another object of this invention is to provide a latching relay drive circuit which requires low power from a battery.

According to this invention, there is provided a latching relay drive circuit for use in a telephone set comprising a battery, switch means for connecting or disconnecting the battery, a capacitor charged by the battery when the switch means is closed, detecting means which detects the voltage of the capacitor when it is charged to a predetermined voltage, means responsive to the voltage detected by the detecting means for discharging the capacitor to drive the latching relay and means for opening the switch means when the voltage of the capacitor reaches the predetermined voltage.

According to this invention, the electricity from the source battery is temporarily charged in a capacitor. When it is detected that the charged voltage of the capacitor rises to a predetermined level sufficient to drive the latching relay, the capacitor is disconnected from the source battery and the latching relay is driven by the current discharged from the capacitor. As a result, even if the internal resistance of the battery becomes too high, a peak current sufficient to set the latching relay can reliably be provided, securing the setting operation of the latching relay. The connection of the battery to the capacitor is established only during the period when the charged voltage of the latter is below the predetermined value and upon exceeding the predetermined value, the battery is disconnected from the capacitor. Thus, the consumption of the battery due to leakage current (of the order of 1 $\mu$A–20 $\mu$A) in the capacitor, etc. can be prevented.

DESCRIPTION OF THE PREFERRED EMBODIMENT

Figure 1:
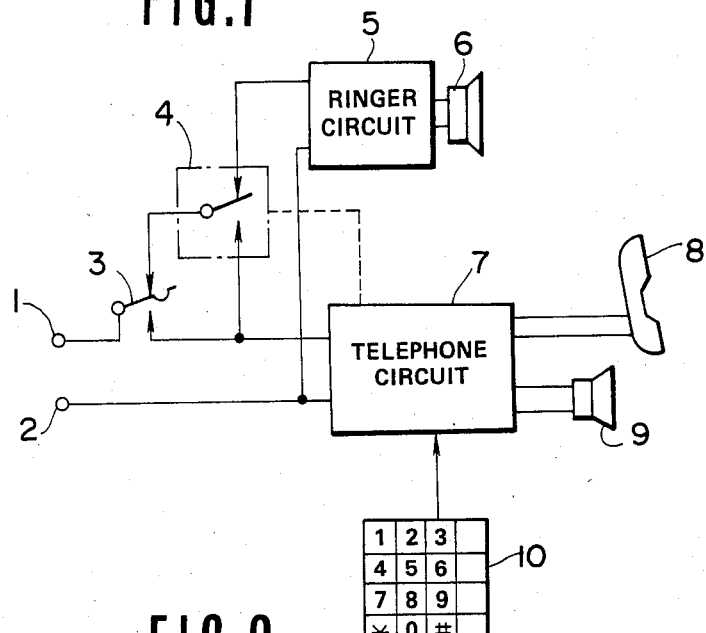
FIG. 1 is a block diagram showing the entire construction of a telephone set to which the invention is applicable.

A telephone set shown in FIG. 1 comprises office line terminals 1 and 2 connected to a subscriber line, a mechanical hook switch 3, a latching relay 4 driven by a drive circuit of this invention and which functions to connect the telephone set to the office lines together with the hook switch 3. A ringer circuit 5 is provided for producing a ringing tone with a sounder 6. There are also provided a telephone circuit 7 including the drive circuit of the latching relay and having a talking mode and a dialling mode, a handset 8, a loudspeaker 9 for monitoring the voice and keys 10 including dial keys and function keys. The telephone circuit 7 is connected to the terminals 1 and 2 through hook switch 3 alone or through hook switch 3 and the latching relay 4, while the ringer circuit 5 is connected to the terminals 1 and 2 through hook switch 3 and latching relay 4 when the telephone set is not in use.

Figure 2:
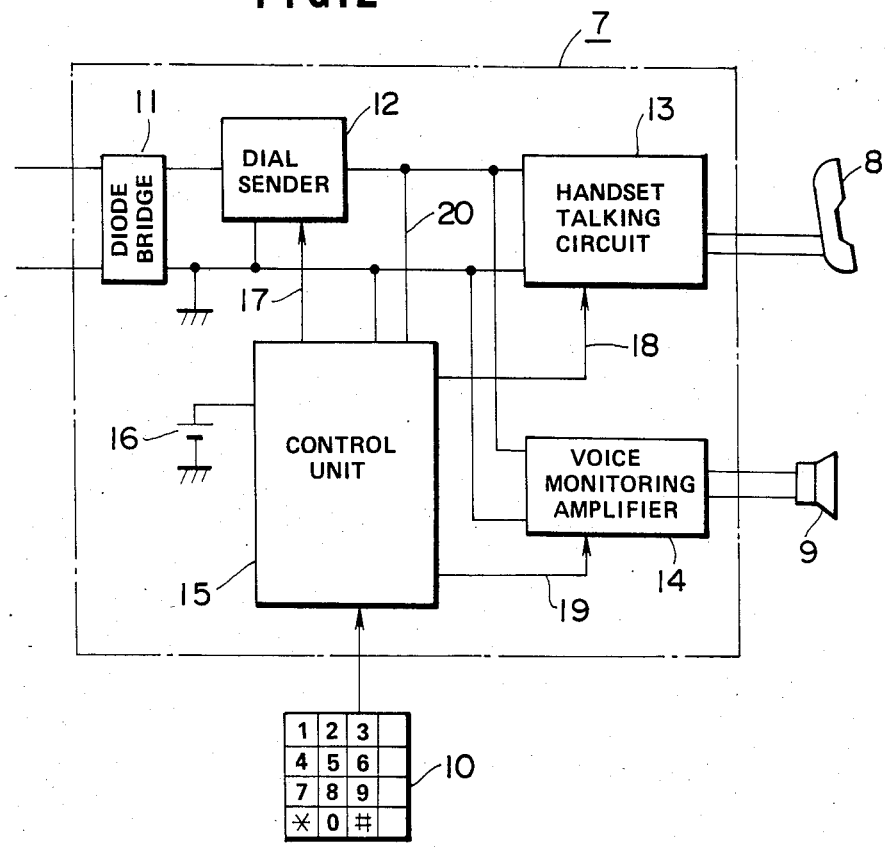
FIG. 2 is a block diagram showing the detail of the telephone circuit shown in FIG. 1.

In FIG. 2 showing the detail of the telephone circuit 7, there are provided a diode bridge circuit 11, a dial sender 12 sending a dial pulse (DP) or a push button (DTMF) signal, a handset talking circuit 13, an amplifier circuit 14 for monitoring voice, a control unit 15 including the latching relay drive circuit embodying the invention, and a battery 16 for operating the latching relay. The control unit 15 controls the dial sender 12, the handset talking circuit 13 and the voice monitoring amplifier circuit 14 respectively through lines 17, 18 and 19. A voice signal and direct current from the telephone office are applied to line 20 in a superposed state.

Figure 3:
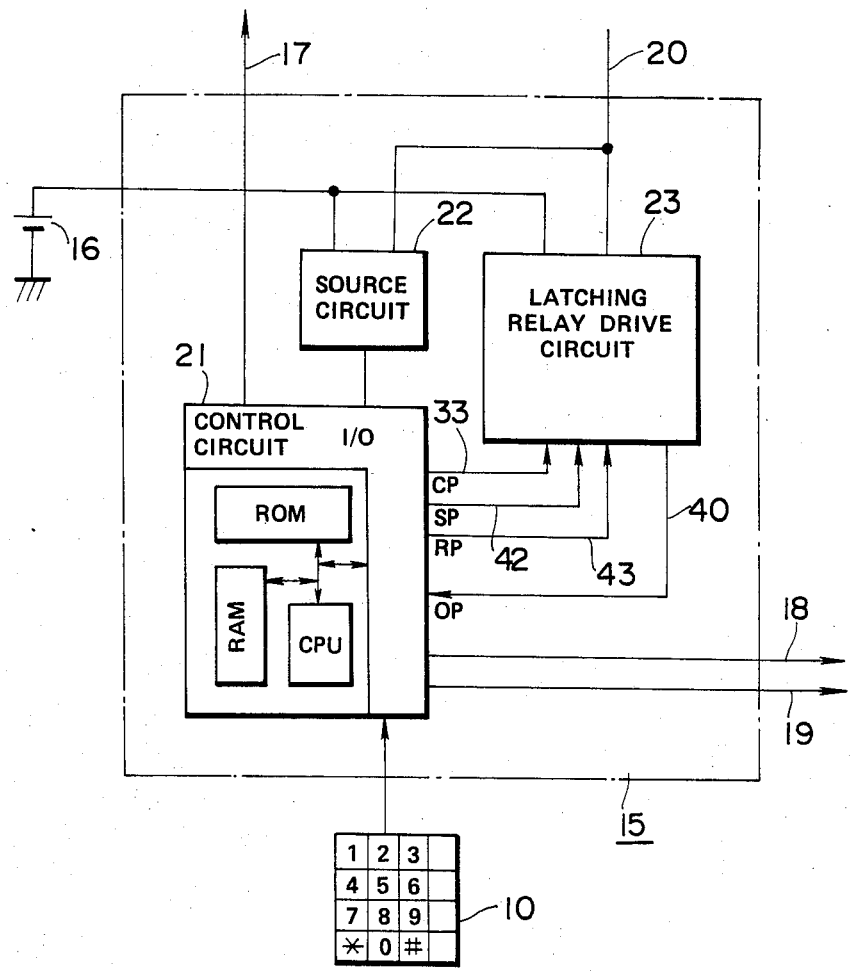
FIG. 3 is a block diagram showing the detail of the control unit shown in FIG. 2.

Referring to FIG. 3 the control unit 15 comprises a control circuit 21, a source circuit 22 for the control circuit 21 and a latching relay drive circuit 23. The control circuit 21 consists of a CPU, a ROM, a RAM and an I/O circuit.

Figure 4:
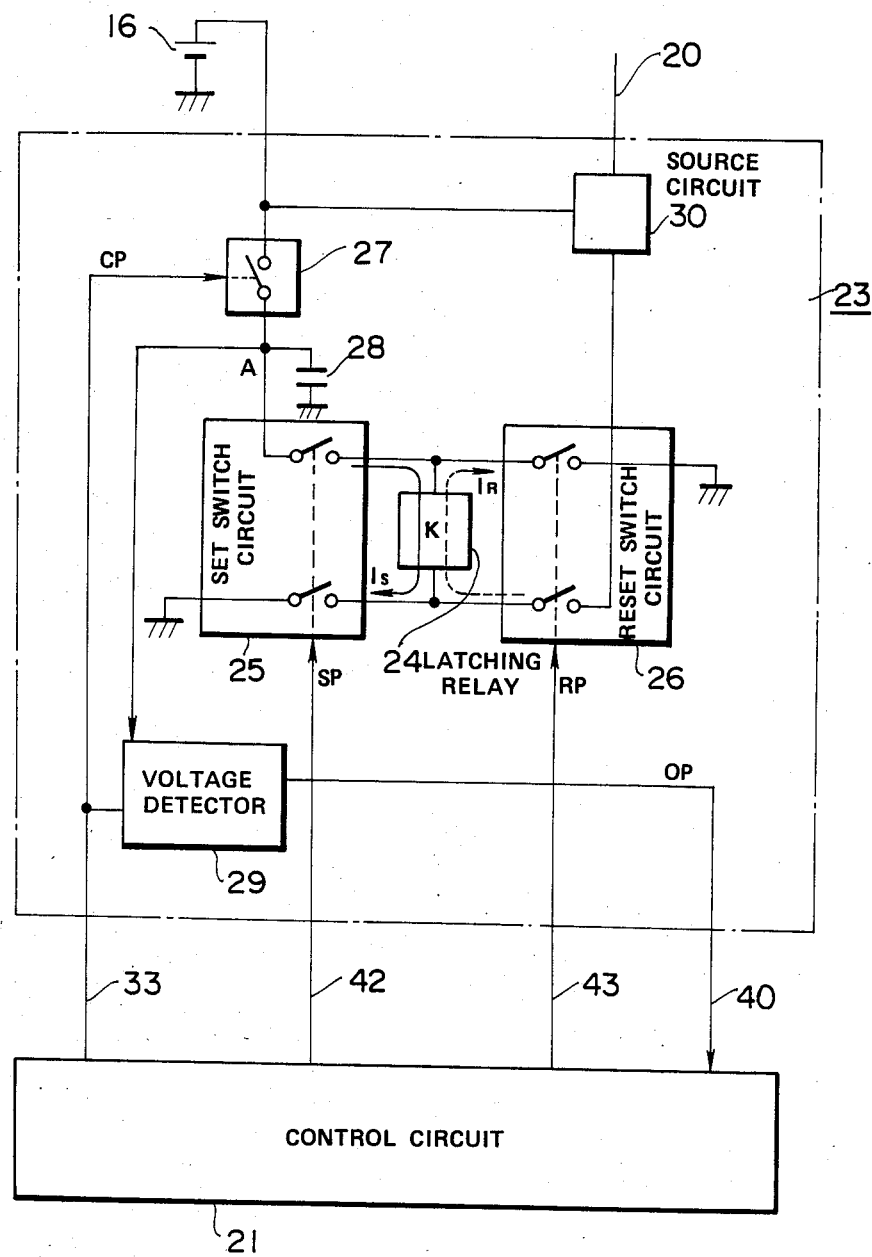
FIG. 4 is a block diagram showing the latching relay drive circuit embodying the invention.

As shown in detail in FIG. 4, the latching relay drive circuit 23 drives a latching relay 24 of a single winding. The latching relay 24 has a set switch circuit 25 constituted by a transistor switch for setting (driving) the latching relay 24 and a reset switch circuit 26 for resetting or deenergizing the latching relay 24. There are also provided a source switch circuit 27 in the form of a transistor switch, a charge/discharge capacitor 28, a voltage detecting circuit 29 which detects that the charged voltage of the capacitor has reached a predetermined value, and a source circuit 30 for operating the reset switch circuit 26.

Figure 5:
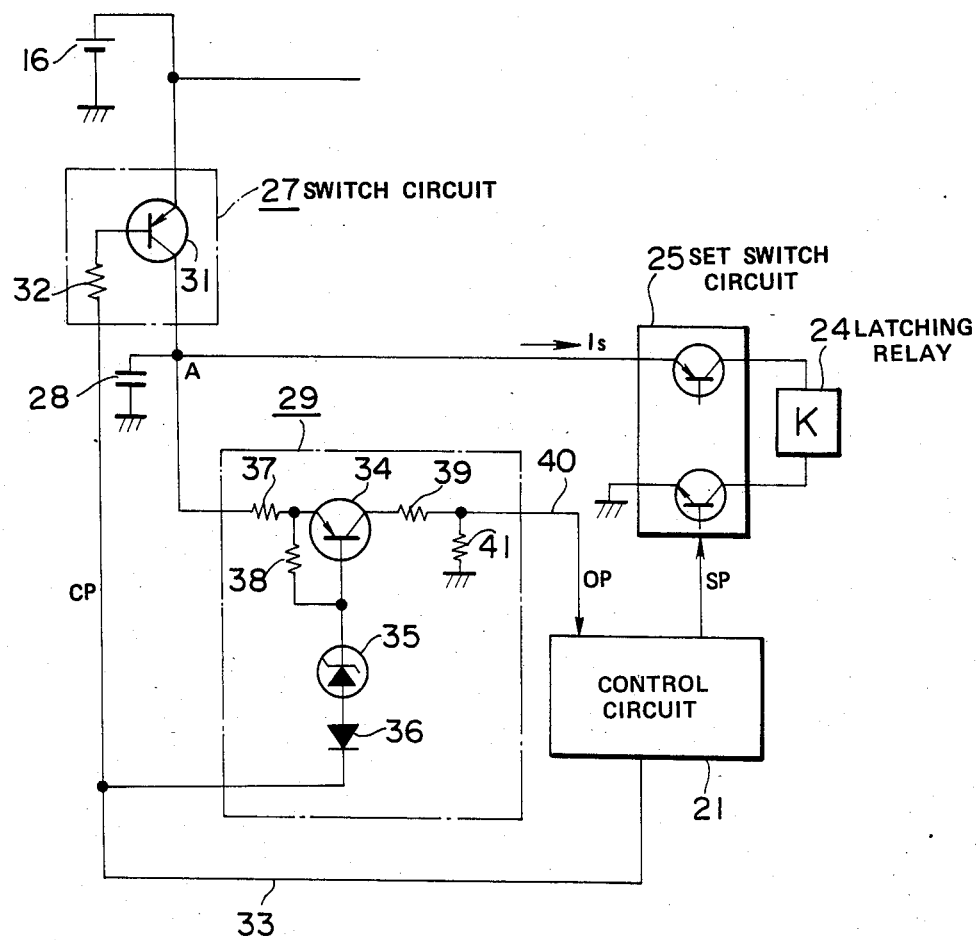
FIG. 5 is a circuit diagram showing the switch circuit and the voltage detecting circuit of the drive circuit.

The detail of the switch circuit 27 and the voltage detection circuit 29 is shown in FIG. 5. More particularly, the switch circuit 27 includes a PNP transistor 31 and the emitter electrode thereof is connected to the positive side of the battery source 16. The collector electrode of transistor 31 is connected to the set switch circuit 25 and the voltage detection circuit 29. The charge/discharge capacitor 28 is connected to the collector electrode of the transistor and to ground. The base electrode of transistor 31 is connected to the control circuit 21 via a base resistor 32 and a control line 33.

The voltage detection circuit 29 comprises a PNP transistor 34, a Zener diode 35 and a diode 36. An emitter resistor 38 is connected between the emitter and base electrodes of transistor 34. The emitter electrode of transistor 34 is connected through a current limiting resistor 37 to a junction A between the collector electrode of the transistor 31 acting as a switch circuit 27 and a capacitor 28. An emitter resistor 38 is connected between the emitter and base electrodes of transistor 34, while the base electrode of transistor 34 in connected to a control line 33 via a Zener diode 35 and a diode 36. The collector electrode of transistor 34 is connected to the control circuit 21 via a current limiting resistor 39 and an output line 40. The output line 40 is grounded through a terminal resistor 41. The control circuit 21 sends a set pulse SP to a set switch circuit via control line 42, and reset pulse RP to the reset switch circuit 26 via control circuit 43 (see FIG. 4). In the case of an ordinary latching relay the set pulse SP and the reset pulse RP have a width of about several milliseconds (ms).

Having completed the description of the construction of one embodiment of the latching relay drive circuit of this invention, we will now describe the operation thereof as follows.

At first, the control circuit 21 generates a control pulse CP to change the potential level of the control line from a high level to a low level, so that the transistor 31 of the switch circuit 27 turns on to charge capacitor 28 with battery 16. When the voltage at junction A rises to a predetermined voltage determined by the Zener voltage of the Zener diode 35 and the forward voltage of diode 36, the Zener diode 35 becomes conductive to lower the base voltage of transistor 34, thus turning it on. As a consequence, an output OP is generated on the output line 40 and applied to the control circuit 21 whereby the control circuit 21 sends a set pulse SP to the set switch circuit 25 of the latching relay 24 over a control line 42. In response to the set pulse SP, the set switch circuit 25 is rendered operative so as to discharge the capacitor 28. The discharge current Is flows downwardly through the coil to it. latching relay 24, thereby setting the After a time, for exaple 20 ms, has elapsed which is sufficient to raise the voltage of the junction A (the charged voltage of capacitor 28) to the predetermined value after the level of the control line 33 has been charged to the low level, the level of the control line 33 is made again to the high level. As a consequence, the transistor 31 of the switch circuit 27 is turned off and the transistor 34 of the voltage detecting circuit 29 is also turned off. Under this state, the control circuit 21 supplies the set pulse SP to the set circuit 25 through the control line 42. More particularly, the latching relay is driven by only the charge stored in the capacitor 28 which has been disconnected from the battery 16, whereby it is possible to prevent consumption of the battery 16 caused by a small leakage current of the capacitor 28 of the order of 1 $\mu A$–20 $\mu A$. To reset the relay 24, a reset pulse RP is applied to the reset switch circuit 26 via control line 43 so that reset current $I_R$ flows through the set switch circuit 26 from the source circuit 30, the reset current $I_R$ flowing UPW and by through the coil of the latching relay 24 as shown by dotted lines shown in FIG. 4.

What is claimed is:

1. A latching relay drive circuit for use in a telephone set comprising:
   a source battery;
   switch means;
   a capacitor charged by said source battery when said switch means is closed;
   detecting means for detecting the fact that said capacitor is charged to a predetermined voltage;
   means responsive to the output of said detecting means, for discharging said capacitor to drive said latching relay; and
   means for opening said switch means when the voltage of said capacitor reaches said predetermined voltage.

2. The latching relay drive circuit according to claim 1 wherein said capacitor is provided in parallel with said source voltage and connected to the same when said switch means is closed.

3. The latching relay drive circuit according to claim 1 wherein said detecting means comprises a transistor having emitter, base and collector electrodes, means for applying the voltage of said capacitor to said emitter electrodes, a resistor connected between said base and emitter electrodes, and a Zener diode connected to said base electrode, whereby said transistor is turned ON when said voltage of said capacitor reaches a predetermined value determined in accordance with a Zener voltage of said Zener diode so as to produce a detected output at said collector electrode.

4. The latching relay drive circuit according to claim 3 wherein said transistor is turned OFF when said switch means is opened.

* * * * *